(12) United States Patent
Yoshimura et al.

(10) Patent No.: US 6,228,343 B1
(45) Date of Patent: May 8, 2001

(54) METHOD FOR PRODUCING ISOTROPIC PITCH, ACTIVATED CARBON FIBERS AND CARBON MATERIALS FOR NON-AQUEOUS SECONDARY BATTERY ANODES

(75) Inventors: Takahumi Yoshimura; Koichi Kanno; Yasuhiro Hirai; Yukio Sakai; Nobuyuki Koike; Yuzuru Takahashi; Hitoshi Sakamoto; Jitsuo Oishi; Takaaki Higashiizumi; Kyoko Shibahara, all of Tukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/293,249

(22) Filed: Apr. 16, 1999

Related U.S. Application Data

(62) Division of application No. 08/924,864, filed on Sep. 5, 1997, now Pat. No. 5,944,980.

(30) Foreign Application Priority Data

Sep. 6, 1996 (JP) .................................................... 8-236677
Sep. 6, 1996 (JP) .................................................... 8-236678
May 9, 1997 (JP) .................................................... 9-119635

(51) Int. Cl.$^7$ .................................................... D01F 9/145
(52) U.S. Cl. ......................................... 423/447.6; 502/418
(58) Field of Search .............................. 423/447.6, 447.7; 502/180, 418; 208/22, 39, 44

(56) References Cited

U.S. PATENT DOCUMENTS

| 4,789,455 | 12/1988 | Mochida et al. | 208/39 |
| 4,891,126 | 1/1990 | Mochida et al. | 208/39 |
| 5,446,005 | * 8/1995 | Endo | 423/447.6 X |

FOREIGN PATENT DOCUMENTS

| 6-256767 | 4/1994 | (JP) . |
| 7-18058 | 3/1995 | (JP) . |

* cited by examiner

Primary Examiner—Stuart L. Hendrickson
(74) Attorney, Agent, or Firm—Leydig, Voit & Mayer, Ltd.

(57) ABSTRACT

A method for preparing a modified optically isotropic pitch comprising, preparing a synthetic pitch by reacting a member selected from the group consisting of a conjugated polycyclic hydrocarbon containing a low molecular weight alkyl group or a material containing such a substituted hydrocarbon in the presence of hydrofluoric acid/boron trifluoride, and treating the synthetic pitch by passing an oxidizing gas through the synthetic pitch at elevated temperatures.

6 Claims, No Drawings

METHOD FOR PRODUCING ISOTROPIC PITCH, ACTIVATED CARBON FIBERS AND CARBON MATERIALS FOR NON-AQUEOUS SECONDARY BATTERY ANODES

This is a divisional of application(s) Ser. No. 08/924,864, filed on Sep. 5, 1997, now U.S. Pat. No. 5,944,980.

FIELD OF THE INVENTION

The present invention relates to a method for preparing modified optically isotropic pitch exhibiting superior stabilization characteristics and activated carbon fibers and anode materials for secondary batteries using said modified optically isotropic pitch.

BACKGROUND OF THE INVENTION

Heretofore, optical isotropic pitch has been prepared from coal pitch or petroleum pitch. Japanese Laid Open Patent Applications 1994-256767 and 1995-18058 teach methods for obtaining superior optical isotropic pitch having excellent stabilization characteristics by particularization of low pressure distillation of and blowing gas into raw materials, such as coal tars. However, the pitch fibers obtained by spinning the optical isotropic pitch obtained from these methods require some protection where high temperatures were applied over long periods in order to stabilize the fibers, and the methods are therefore not entirely satisfactory.

In addition, U.S. Pat. No. 4,789,455 discloses that it is possible to prepare a pitch that may be suitably applied as a high performance carbon material for carbon fibers or other applications by polymerizing conjugated polycyclic hydrocarbons or materials containing them in the presence of an HF/BF, catalyst. When the isotropic pitch thus obtained is used for the manufacture of carbon fibers and the like, melt adhesion of the fibers occurs easily during spinning because of a low softening point, and it takes an extremely long time to stabilize the fibers. Where the softening point of the pitch is raised to decrease the time required to stabilize the fibers, then, as taught by U.S. Pat. No. 4,891,126, the pitch obtained has anisotropic properties and fundamentally has ceased to be an isotropic pitch.

The fact that the time required for stabilization when carbon fibers are prepared from either of the aforementioned coal type or petroleum type pitches is so long is an important problem from the standpoint of produceability. In particular, pitch fibers obtained using optically isotropic pitch as raw material require a long period of time for stabilization compared with pitch fibers obtained using optically anisotropic pitch as the raw material, and the stabilization process is difficult.

With respect to various carbon material applications, such as for use as carbon fibers, activated carbon fibers and anode materials for secondary batteries using a non-aqueous solvent, an optically isotropic pitch that can easily be stabilized as pitch fiber or pitch granules ground to various particle sizes is desired.

Accordingly, it is an object of the present invention to provide a method for making optical isotropic pitch with superior stabilization characteristics for various carbon material applications. It is a further object of the invention to provide a method for producing activated carbon fibers and amorphous type secondary battery material having superior characteristics.

SUMMARY OF THE INVENTION

The present invention is predicated on the discovery that an optically isotropic pitch with clearly superior stabilization characteristics can be obtained by polymerizing conjugated polycyclic hydrocarbons substituted with one or more low molecular weight alkyl groups, or a material containing such a conjugated polycyclic hydrocarbon, in the presence of an $HF/BF_3$ catalyst and treating the resulting polymerized material at elevated temperature with a flow of oxidizing gas.

In one embodiment, the present invention thus provides a method of preparing modified optically isotropic pitch characterized by the polymerization of a conjugated polycyclic hydrocarbon containing at least one low molecular weight alkyl group, or materials containing such conjugated polycyclic hydrocarbons, using an $HF/BF_3$ catalyst and, at elevated temperatures, passing an oxidizing gas through the pitch thus obtained. In another embodiment, the invention provides a method of preparing activated carbon fibers characterized by melt spinning the modified optically isotropic pitch obtained in accordance with the invention, and after stabilization of said modified pitch, conducting activation treatment. In yet another embodiment, the invention provides a method of preparing anode material for secondary batteries using a non-aqueous solvent characterized by conducting stabilization treatment on the said modified pitch and then calcining.

Using the modified optically isotropic pitch obtained by the method of the present invention, it has been found that activated carbons having high absorption capacity can be obtained. The activated carbon can be applied effectively to gas separation or water treatment and formed for use in secondary battery anodes in which minimization of capacity loss in the initial cycle together with large discharge capacity as compared with materials used to lithium secondary batteries heretofore is achieved.

The flow diagram for preparing the modified optically isotropic pitch, the activated carbon fiber and the anode material for a secondary battery that uses a non-aqueous solvent is as follows:

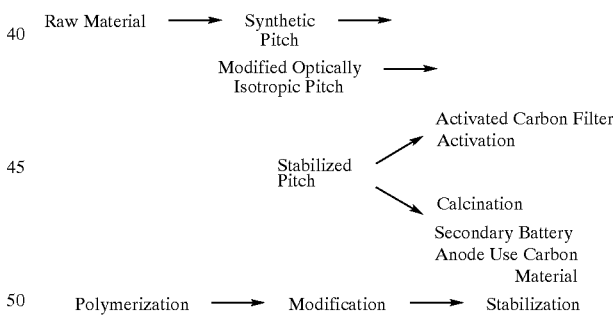

DETAILED DESCRIPTION OF THE PREFERRED EMBODIMENTS

A conjugated polycyclic hydrocarbon containing at least one low molecular weight alkyl group is used as the raw material in accordance with the present invention. Conjugated polycyclic hydrocarbons suitable for use in the present invention include: derivatives of conjugated polycyclic hydrocarbons such as naphthalene, anthracene, pyrene, coronene and the like, which contain at least one low molecular weight alkyl group; derivatives of heteropolycyclic hydrocarbons such as benzofuran, quinoline, thianaphthalene, and the like, containing at least one low molecular weight alkyl group; mixtures of the heteropolycyclic hydrocarbons with the aforementioned derivatives of polycyclic hydrocarbons; or coal tar distillates, petroleum distillates, residues from petroleum processing and the like. In the present invention, low molecular weight alkyl groups refers to alkyl groups attached to the aforementioned conjugated polycyclic hydrocarbons that have between 1 and 10 carbon atoms and particularly those having between 1 and 3 carbon atoms. In particular, the methyl group is preferred as the low molecular weight alkyl group and naphthalene derivatives including methyl naphthalene or dimethyl naphthalene as well as mixtures of such compounds with the methyl naphthalene fraction of coal tar and ethylene bottom oil and the like are particularly preferred.

Isotropic pitch is prepared by polymerizing the conjugated polycyclic hydrocarbon in the presence of a suitable polymerization catalyst. The preferred catalyst used in the polymerization reaction of the conjugated polycyclic hydrocarbons containing at least one low molecular weight alkyl group is hydrofluoric acid/boron trifluoride. The amount of hydrofluoric acid used with respect to one mole of the conjugated polycyclic hydrocarbon or its equivalent is on the order of between about 0.1 to about 10 moles pet mole of conjugated polycyclic hydrocarbon or its equivalent and the amount of boron trifluoride is between about 0.05 to about 5 moles per mole of conjugated polycyclic hydrocarbon or its equivalent. The reaction temperature is between 20° C. and 250° C. and preferably between 40° C. and 220° C. If the reaction temperature is too low, the degree of polymerization is also too low, and a satisfactory optically isotropic pitch cannot be obtained. If the reaction temperature is too high, the pitch obtained has anisotropic properties and fundamentally has ceased to be an isotropic pitch. The amount of time required for the polymerization reaction is usually between 5 and 300 minutes and preferably between 30 and 240 minutes. The reaction pressure is not particularly limited and the reaction is normally conducted under self-generated pressure within the reaction vessel under the other conditions described herein.

After completing polymerization, the catalyst, the unreacted raw materials and other light fractions are removed by conventional methods, such as extraction or distillation. For example, after the reaction, the pressure in the reaction vessel may be reduced so that the catalyst can be recovered. A stripping gas and increased temperature may also be applied inside the reaction vessel to ensure the efficiency of catalyst recovery. Moreover, following catalyst recovery, unreacted raw materials or light fractions may be removed from the reaction product by passing through it a non-reactive stripping gas.

The softening point of the pitch obtained by the polymerization reaction of the present invention is typically less than 200° C. and is preferably between about 40° C. and about 180° C. If the softening point is too low, the molecular weight of the pitch is generally small, and, later, the yield of optically isotropic pitch obtained by treatment with an oxidizing gas at elevated temperatures declines, which is an undesirable result. If the softening point exceeds 200° C., then depending upon the specific raw material used, but, within the isotropic optical structure of the pitch, the appearance of optical anisotropy becomes more common making the whole material, in fact, anisotropic so that the pitch, which is the object of this invention, is not obtained.

In the preferred isotropic pitch obtained from the polymerization reaction, a ratio of hydrogen atoms to carbon atoms in the pitch of 0.5 to 1.0, a pyridine insoluble fraction of less than 1.0% and a ratio of aliphatic hydrogen to total hydrogen of 30% to 80% are desired. The pitch obtained from the polymerization reaction is substantially 100% isotropic. The isotropic nature of the pitch can be measured by conventional methods. For example, pitch can be embedded in epoxy resin and then the epoxy is ground to expose the surface of the pitch.

In keeping with the invention, the synthetic pitch from the polymerization is further modified by blowing an oxidizing gas through the pitch while the polymerized pitch is in a molten condition. The oxidizing gas used in the modification is preferably oxygen, air, nitric oxide and the like. From the standpoint of economics, safety and controllability, the use of air is preferred. The temperature of the modification is not a fixed temperature, but instead depends upon the softening point of the pitch. The preferred range is from about 200° C. to about 400° C. and, preferably, from about 300° C. to about 360° C. If the temperature of the modification process is too low, the oxidation of the pitch proceeds too slowly and modification is difficult to attain. However, if the temperature is too high, the oxidation reaction accelerates, control becomes difficult and thermal autopolymerization of the pitch becomes more likely, making the obtaining of the modified pitch of the present invention more difficult. When the modification procedure is carried out, the flow of the oxidizing gas differs according to the type of gas, the softening point of the pitch, the reaction temperature and the like, but in the case where air, which is easy to control, is used as the oxidizing gas, then between about 1 and about 50 ml/gr of pitch and, preferably, about 3 to about 30 ml/gr of pitch are used. The method of modification is not particularly limited, but to increase the efficiency of the contact between the gas and the pitch, a mesh filter or stirrer is preferably attached over the opening through which the gas is introduced to the pitch. The point at which the modification by the oxidizing gas has been completed, because the softening point rises together with the advance of the improvement, can be judged by measuring the softening point.

The modified optically isotropic pitch, if desired, may be made into fibers by passing it through a nozzle of on the order of about 0.1 to about 0.3 mm diameter. The softening point of the modified optically isotropic pitch is preferably between about 180° C. and about 350° C. and preferably between about 200° C. and about 300° C. If the softening point is less than about 180° C., then either as pitch fibers or as granules it is necessary to begin stabilization treatment from a low temperature, which necessitates longer procedures. and the degree of stabilization will be reduced. If the softening point is in excess of about 350° C., then it becomes difficult to draw the pitch through the necessary equipment, so from the standpoint of usability as a product, it becomes impractical. In spinning the molten pitch a softening point of less than about 300° C. is preferred. The modified pitch is substantially 100% isotropic. Moreover, when preparing carbon material for use in secondary batteries using a non-aqueous solvent, the modified optically isotropic pitch of the present invention preferably has a ratio of hydrogen atoms to carbon atoms of between 0.50 and 0.80 and the ratio between the intensity of the aliphatic stretch vibration peaks for C—H and that of the aromatic stretch vibration peaks for C—H is 0.5 or greater.

The pitch of the present invention, when viewed through a polarizing microscope, shows substantially 100% optical isotropy. The softening point can be measured by a fixed load weight extruder capillary rheometer. The conditions of stabilization of the pitch fiber can easily be determined by the lighter test. If when pitch fibers are placed within a lighter flame, the stabilization process is not complete, the fiber becomes limp or melts, whereas when stabilization is complete, the fiber's initial shape is maintained and the fibers begin to glow with a red color in the flame.

The modified optical isotropic pitch obtained by the method of the present invention, whether as pitch fibers or as pitch granules, can be stabilized very easily. The stabilization treatment may be carried out under an atmosphere of, for example, oxygen, oxygen rich air, air $NO_2$ gas or the like by raising the temperature at a rate of usually between about 2° C. to about 15° C./minute and preferably between about 3° C. to about 12° C./minute over a temperature range of between room temperature and about 400° C. and preferably up to about 360° C. When stabilizing most materials, after the temperature has risen, it should be maintained constant for several hours at the peak temperature. However, using the method of the present invention, it is not necessary to maintain the elevated temperature after the temperature rise has been completed so stabilization can be accomplished in a very short time.

The optically isotropic pitch modified by the methods of the present invention can be used ideally for the carbon materials of activated carbon fibers and the anode materials of secondary batteries as described below.

Following is an explanation of the preparation method for making activated carbon fibers using the modified optical isotropic pitch of the present invention. The optically isotropic pitch modified by the oxidizing gas in a molten condition is passed through a nozzle of about 0.1 to 0.3 mm or so in diameter to produce pitch fibers which are then stabilized. The pitch fibers which have been stabilized are then given the following activation treatment: With regard to the activation treatment there are no particular limits, and it should be possible to use the activation methods of the prior art. For example, activation can be carried out by steam, carbon dioxide, oxygen or a gas containing at least one of these passed over the fiber of a temperature preferably between 700° C. and 1000° C. for between about 10 to 150 minutes. It is also acceptable to carbonize the stabilized pitch fibers at low temperature prior to activation and they can be carbonized after activation as well. Either batch activation type and continuous activation type equipment, of which there are plentiful examples known to the prior art may be used.

Molten spinning fibers can be made from the modified optically isotropic pitch of the present invention readily and accomplished in a very short period of time. Since activation can be carried out in a very short time, it is possible to manufacture activated carbon fibers industrially with high absorption capacity.

In addition, the activated carbon fibers obtained by the present invention can be used effectively in gas separation or water treatment.

Anode material for secondary batteries that use non-aqueous solvents using optically isotropic pitch obtained according to the present invention can be prepared as follows. After the modified optically isotropic pitch has been fashioned into granular, fiber or thin sheet form and stabilized, the stabilized pitch is calcined under a vacuum, or a non-oxidizing gas, to obtain the anode suitable carbon material of the present invention. The calcination temperature is between about 800° C. and about 1800° C. and preferably between about 1000° C. and about 1300° C. The calcination time is selected so as to provide optimum results depending upon the particular raw materials used at between about one and about 50 hours. Moreover, it is acceptable to carry out pre-calcination at about 800° C. or less. As the non-oxidizing gas, nitrogen or argon are preferred. The non-oxidizing gas is provided to the reaction in a continuous flow and methods that balance the rate of flow to complement off-gassing from the calcination reaction or methods that force the removal of gas generated during the reaction using a vacuum may be optically applied depending upon the materials and conditions used in a particular reaction.

The anode material for a secondary battery using a non-aqueous solvent of the present invention is characterized in that the ability of this material to discharge at a potential of between 0 and 1.5V against a lithium metal potential represents a discharge capacity of 540 mAh/g or more. It also exhibits a flat discharge curve in the region between 0 and 0.2V against a lithium metal potential representing a discharge capacity of 380 mAh/g and a first cycle capacity loss of 100 mAh/g or less. Therefore, the anode material for use in a secondary battery using a non-aqueous solvent of the present invention, in comparison with lithium secondary battery carbon anode materials used heretofore, is superior from the standpoints of produceability, it has a large discharge capacity and it has reduced the first cycle capacity loss. The anode material can be used for a large capacity, low cost secondary battery.

EXAMPLES

The present invention will be explained in greater detail by the following examples which are illustrative of, but not in limitation of, the present invention. The analysis methods used in the examples are specified below.

Elemental Analysis

Analyses for carbon, nitrogen and hydrogen are performed simultaneously using a 2400 CHN type elemental analyzer made by Perkin Elmer as the analysis equipment.

The measurement is carried out by precisely measuring a sample of pitch weighing 1.5±0.2 mg, heating the sample for 5 minutes at 975° C. and conducting a TCD using helium as the carrier gas. Additionally, in measuring the sample, a small amount of acetonitrile (2.0 mg±0.1 mg) was tested at first to serve as a standard.

NMR Analysis

The $^1$H-NMR method is used to determine the ratio of the amount of aliphatic hydrogen to the total hydrogen in the sample. Since almost the entire mass of pitch will dissolve in chloroform, a 1% solution of the pitch in chloroform is placed in the sample tube and the measurement is carried out by a Japan Electric (Inc.) JNM-EX270 NWR measurement device. In addition, TMS (tetramethyl silane) is used as the standard and set at a value of 0 ppm.

FT-IR Analysis

One part by weight of modified optically isotropic pitch is added to 100 parts of KBr powder and mixed in an agate mortar. A Japan Spectrographic (Inc.) FT/IR-5300, wide band reflective type measuring device set to D-81 was used to obtain wide band spectra of the sample by comparing the intensity of the peak at 2930 cm −1 (the intensity of the aliphatic stretch vibration) with the intensity of the 3050 cm −1 peak (the aromatic stretching vibration in spectra obtained by the Kubelka Munk transformation.

Iodine Absorption Volume

About 50mg of the activated carbon fiber is taken, measured precisely and placed it in a 100 ml Ehrlenmeyer flask, to which 50 ml of 0.05 mol/L iodine solution is added. After stirring for 15 minutes at room temperature using a mechanical stirrer, the sample is separated using a centrifugal separator. 10 ml of the supernatant liquid were titrated using a sodium thiosulfate solution and the amount of iodine absorbed was calculated as follows:

the amount of iodine absorbed (mg/g)=$(10 \times f'-K \times f) \times 12.69 \times 5/M$ where:
- f': the coefficient of the iodine solution consumed by an 0.1 mol/1 sodium thiosalfate solution
- K: the amount (ml) of 0.1 mol/1 sodium thiosulfate solution needed for titration
- f: the coefficient of the 0.1 mol/1 sodium thiosulfate solution
- 12.69: the number of mg of 0.1 mol/1 sodium thiosulfate solution consumed by 1 ml of iodine solution
- M: the weight of the sample (g).

Example 1

Seven moles of a mixture of α and β methyl naphthalene were mixed with 5.15 moles of hydrofluoric acid in a 3 L acid resistant autoclave equipped with a mechanical stirrer and 1.4 moles of boron trifluoride were added while stirring slowly. Next, after raising the temperature to 100° C. under the pressure self-generated by the reaction, the polymerization reaction was conducted with stirring at 100° C. over 4 hours. After the reaction was complete, the catalyst was recovered using reduced pressure. The removal by vaporization of any remaining catalyst or unreacted raw materials was accomplished by passing three liters per minute of nitrogen gas through the vessel at 200° C. for 16 hours. The synthetic pitch obtained had a softening point of 76° C. and the ratio of hydrogen atoms to carbon atoms (H/C) was found to be 0.87. Moreover, after grinding this pitch by conventional methods, when it was examined under a polarizing microscope, its makeup was found to be 100% optically isotropic.

The synthetic pitch prepared above was placed in a second reaction vessel and was stirred while raising the temperature to 340° C. and blowing nitrogen gas through the pitch. When the temperature inside the vessel was stabilized at 340° C., the gas being blown through the pitch was changed from nitrogen to air to begin modification of the pitch. The air volume blown through the pitch at that time was 20 L/kg. After conducting the modification reaction for one hour, the reaction was stopped by exchanging the gas blown through the pitch back to nitrogen and reducing the temperature in the reaction vessel. The softening point of the modified optically isotropic pitch was 246° C., the H/C ratio was 0.63 and the optical makeup of the pitch was 100% isotropic.

Pitch fiber was obtained by spinning the modified optically isotropic pitch in a molten state through a nozzle having a diameter of 0.15 mm. The pitch fibers were heated from room temperature to 320° C. at a rate of 4° C./minute and after reaching 320° C. were taken from the apparatus. A degree of stabilization in which there was no melt adhesion of fibers was achieved completely following this stabilization treatment. The fibers were then calcined and following calcination, no melt adhesion was observed to have taken place.

In addition, the modified optically isotropic pitch was ground to a powder in a ball mill. Tests for melt adhesion of the modified pitch in powder form were conducted in the same way that the mill adhesion test had been conducted for the fibers. Stabilization of the modified pitch in powder form was again observed to have been successful.

Example 2

The modified optically isotropic pitch obtained in Example 1 was spun into fibers using the same methods as in Example 1. The pitch fibers thus obtained were stabilized using air and raising the temperature to 320° C. at a rate of 3° C./minute. The fibers thus obtained were observed to have been well stabilized such that they neither burned up nor fused together when heated.

These fibers were subjected to activation treatment at 1000° C. for 1 hour under in atmosphere of nitrogen containing 15% carbon dioxide to obtain activated carbon fibers. The activated carbon fibers thus obtained absorbed 1400 mg of iodine per gram of fiber.

Example 3

Two moles of the methyl naphthalene fraction of coal tar pitch, 1.46 moles of hydrofluoric acid and 0.4 moles of boron trifluoride in a 500 ml were mixed in an acid resistant autoclave and reacted at 135° C. under self-generated pressure. The reaction was continued for 4 hours at 135° C. After reaction, the catalyst was recovered by reducing the pressure, and low boiling components were removed by blowing through the pitch 1 L of nitrogen heated to 200° C. The resulting synthetic pitch had a softening point of 89° C. The synthetic pitch thus obtained had a hydrogen to carbon ration (H/C) of 0.80. Moreover, after grinding the pitch to a powder by the usual means, when it was viewed under a polarizing microscope, it was observed to be 100% optically isotropic.

The synthetic pitch obtained above was placed in a second reaction vessel and was reacted for 40 minutes at 350° C. while air was were blown through the pitch at a rate of 20 L/kg. The modified pitch thus obtained had a softening point of 220° C. and an (H/C) ratio of 0.62. The optical makeup was 100% isotropic.

The modified optically isotropic pitch thus obtained above was spun into fibers by the same methods as in Example 1. The spun pitch fibers thus obtained were stabilized by heating them at a rate of temperature increase of 3° C./minute from room temperature until a temperature of 320° C. was attained under a flow of air. The stabilized fibers thus obtained were observed to be stabilized such that melt adhesion and burning did not occur. The stabilized fibers were activated according to the same methods as in Example 2, and activated carbon fibers were obtained. The iodine absorption capacity of the activated carbon fibers thus obtained was 1940 mg of iodine per gram of fibers.

Example 4

Exactly 1420 grams of ethylene bottom oil, 5.25 moles of hydrofluoric acid, and 1.5 moles of boron trifluoride were mixed in a three liter acid resistant autoclave. After raising the temperature to 120° C. under self-generated pressure the reaction was conducted for 4 hours at 120° C. After reaction, catalyst was recovered by reducing the pressure. Low boiling components of the pitch were removed by passing 3 L/minute of nitrogen gas through the pitch at 120° C. to obtain a synthetic pitch having a softening point of 107° C. The synthetic pitch thus obtained had a hydrogen atom to carbon atom ratio of 0.95 and a pyridine insoluble fraction of 0.0%. The ratio of aliphatic hydrogen to all hydrogen present in the pitch was 66%, and the optical makeup was 100% isotropic.

The synthetic pitch obtained above was placed in a second vessel and heated to 340° C. and 20 L of air per kilogram of pitch were passed through the pitch to conduct the reaction over 2 hours. The modified optically isotropic pitch thus obtained had a softening point of 246° C., an (H/C) of 0.78 and the ratio of the intensity of the aliphatic C—H stretch vibration to the aromatic stretch vibration was 2.9 when measured by FT-IR. The optical makeup of the pitch was 100% isotropic.

After spinning the modified optically isotropic pitch thus obtained into fibers according to the same methods as in Example 1, the spun pitch fibers thus obtained were stabilized by heating from room temperature to 320° C. at a rate of temperature increase of 4° C./minute under a flow of air. The spun fibers thus obtained were stabilized well enough so that no melt adhesion or burning up were observed. The stabilized fibers were activated according to the methods described in Example 2 and activated fibers were obtained. The activated fibers thus obtained absorbed 1330 mg of iodine per gram of fiber.

Comparative Experiment 1

Exactly 10 moles of naphthalene, 2.07 moles of hydrofluoric acid and 1.16 moles of boron trifluoride were mixed in a 3 L acid resistant autoclave and, after raising the temperature to 210° C. under self-generated pressure, the reaction was a maintained at 210° C. for four hours to complete the reaction. Next, the pressure was reduced to recover the catalyst and, after removing lighter boiling components of the pitch at 340° C. with 3 L/minute of nitrogen, a synthetic pitch with a softening point of 174° C. was obtained. The synthetic pitch thus obtained had a hydrogen atom ratio to carbon atom ratio (H/C) of 0.64. Moreover, when this pitch was ground by the usual methods, when viewed by polarizing microscope, the optical makeup was 100% isotropic. The synthetic pitch was placed in a second vessel, and reacted for 1 hour at 340° C. with 20 L per kilogram of air passed through the pitch. The softening point of the point thus obtained was 218° C., the (H/C) was 0.52 and the optical makeup was 100% isotropic.

The modified optically isotropic pitch thus obtained was spun into fibers under melted conditions according to the same methods as were used in Example 1. However, the pitch fibers so obtained could not be stabilized at a rate of 0.5° C./minute so as to avoid melt adhesion and burning up. At the slow rate of 0.25° C./minute temperature raise up to a maximum of 300° C. stabilization was conducted and it was then possible to obtain a stabilized pitch that did not burn up or adhere to itself. The stabilized fiber was activated according to the same conditions as were employed in Example 2, and an activated fiber was obtained. However, the iodine absorption amount of the activated fiber was low at 210 mg/g pitch fiber.

Comparative Experiment 2

A commercially available coal tar pitch was placed in the reactor and the temperature inside the reaction vessel was raised to 3200C while stirring and blowing nitrogen gas through it. When the temperature inside the vessel had been stabilized to 320° C., the gas being blown through the pitch was changed from nitrogen to air to modify the pitch. The volume of air in this instance was 20 L/kg. After the reaction had proceeded for one hour, the gas blown through the pitch was changed back to nitrogen from air and the reaction vessel was cooled to stop the reaction. The modified pitch thus obtained had a softening point of 227° C., and its optical makeup was 100% isotropic.

The modified optical isotropic pitch thus obtained was melt spun according to the method of Example 1 to obtain a pitch fiber. This pitch fiber was heated at a rate of temperature increase of 4° C./minute from room temperature to 320° C. and, after attaining 320° C., was removed from the apparatus. The fiber, following this stabilization procedure had adhered due to melting and the stabilization process was inadequate. Whenever the rate of temperature increase was 0.5° C./minute or more, it was not possible to stabilize the fibers. When heating was carried out at the very slow rate of 0.25° C./minute up to a temperature of 300° C., stabilization was achieved and a stabilized fiber that did not undergo melt adhesion could be obtained. When this stabilized fiber was activated according to the same methods as in Example 2, activated carbon fibers were obtained. The activated carbon fibers thus obtained exhibited the low iodine absorption value of 650 mg/g of activated carbon fibers.

Comparative Experiment 3

A pitch fiber was obtained by melt spinning the synthetic pitch of Comparative Experiment 1 without first modifying it. This pitch fiber was stabilized by heating at a rate of 4° C./minute from room temperature to 320° C. However, melted regions remained in the fiber and it was not possible to effect stabilization.

Example 5

This Example illustrates the preparation of pitch for use as the anode material for a lithium secondary battery.

Seven moles of methyl naphthalene, 3.68 moles of hydrofluoric acid and 1.16 moles of boron trifluoride were mixed in a 3 L acid resistant autoclave and after raising the temperature to 100° C. under self-generated pressure, the reaction was conducted at 100° C. for four hours. Next, the catalyst was recovered by reducing the pressure and after removing the low boiling components of the pitch by passing 3 L/minute of nitrogen gas through the pitch a t 200° C., a synthetic pitch having a softening point of 76° C. was obtained. The synthetic pitch thus obtained had a hydrogen atom to carbon atom ratio of 0.95 and a pyridine insoluble fraction of 0.0%, the ratio of aliphatic hydrogen to all hydrogen present in the pitch was 58%.

The synthetic pitch obtained above was placed in a different vessel and heated to 320° C. and 20 L of air per kilogram of pitch were passed through the pitch to conduct the reaction over 2 hours. The modified optically isotropic pitch thus obtained had a softening point of 200° C. The ratio of hydrogen atoms contained in the pitch to carbon atoms (H/C) was 0.66. The ratio of the intensity of the aliphatic C—H stretching vibration band to the intensity of the aromatic stretching vibration band measured by FT-IR was 1.1. This modified optical isotropic pitch was ground to particles having a diameter of 200 $\mu$m or less. Ten grams of this material was placed on a flat ceramic dish and placed in a muffle furnace under a flow of 1 L per minute of air. The temperature in the muffle furnace was raised at a rate of 5° C./minute from 150° C. to 300° C. and maintained at 300° for 10 minutes to obtain treated pitch. The treated pitch thus obtained was ground to an average particle diameter of 15 $\mu$m. A small amount of this material was calcined at 1200° C. for two hours at 10 Torr under a slight flow of nitrogen gas.

Evaluation of Anode Material

Ten parts by weight of polyfluorovinylidene powder (binder) was added to 90 parts by weight of the calcined carbon material obtained above and dimethylformamide, and the mixture was thoroughly mixed to provide a substantially uniform paste.

The paste was coated onto a thin copper film and, after drying, the film was cut into 1 centimeter squares which served as test electrodes. Half cells were prepared with the test electrode, a 1.0 molar solution of $LiClO_4$ dissolved in a three component solvent consisting of ethylene carbonate, dimethylcarbonate and diethylcarbonate mixed in a ratio of 1/0.5/0.5 respectively as the electrolyte and a 50 μm thick microporous polypropylene film as the separator. Additionally, a lithium metal disk having a diameter of 16mm and a thickness of 0.5 mm was employed as a counter electrode. A lithium metal disk meeting the same description served as the reference electrode.

Charging was carried out at a constant current at a current density of 2 $mA/cm^2$ up to a test electrode electrode potential versus the reference electrode of 1 mV. Constant potential charging was carried out at 1 mV for 40 hours. The stored capacity was observed to be 647 mAh/g. Constant current discharge was carried out at a current density of 1 $mA/cm^2$ up to a test electrode electrode potential versus the reference electrode of 1.5V, and the discharge capacity was observed to be 562 mAh/g. There was a capacity loss of 85 mAh/g and the discharge capacity between 0 and 0.2V was 417 mAh/g.

Example 6

This Example illustrates the preparation of pitch for use as the anode material for a lithium secondary battery.

Seven moles of dimethyl naphthalene, 4.90 moles of hydrofluoric acid and 1.40 moles of boron trifluoride were mixed in a 3 L acid resistant autoclave, and after raising the temperature to 120° C. under self generated pressure, the reaction was conducted at 120° C. for four hours. Catalyst was recovered by reducing the pressure, and after removing the low boiling components of the pitch by passing 3 L/minute of nitrogen gas through the pitch a t 200° C., a synthetic pitch having a softening point of 40° C. was obtained. The synthetic pitch thus obtained had a hydrogen atom to carbon atom ratio of 0.91 and a pyridine impurity of 0.0%. The ratio of aliphatic hydrogen to all hydrogen present in the pitch was 66%.

The synthetic pitch prepared above was placed in a second vessel and heated to 320° C. Twenty liter of air per kilogram of pitch was passed through the pitch over a 2 hour reaction time to obtain a 100% optically isotropic modified pitch with a softening point of 249° C. This modified optically isotropic pitch had a ratio of hydrogen atoms contained in the pitch to carbon atoms (H/C) of 0.65 and a ratio of the intensity of the aliphatic C—H stretching vibration band to the intensity of the aromatic stretching vibration band measured by FT-IR of 1.6. The modified optical isotropic pitch was ground to particles having a diameter of 200 μm or less. Ten grams of this material was placed on a flat ceramic dish and placed in a muffle furnace under a flow of 1 L per minute of air. After raising the temperature in the muffle furnace at a rate of 5° C./minute from 150° C. to 300° C. and maintaining this latter temperature for 10 minutes to obtain treated material. The treated material thus obtained was ground to particles having an average diameter of 15 μm. A small amount of the treated material was calcined at 1200° C. for two hours at 10 Torr under a slight flow of nitrogen gas.

The treated material was converted to anode material, and the anode material was evaluated according to the methods of Example 5. A storage capacity of 635 mAh/g, and a discharge capacity of 547 mAh/g were observed. The capacity loss was 88 mAh/g and the discharge capacity between 0 and 0.2 V versus the lithium metal counterelectrode was 397 mAb/g.

Example 7

This Example illustrates the preparation of pitch for use as the anode material for a lithium secondary battery.

The modified optically isotropic pitch obtained in Example 4 was ground to a powder of less than 200 μm in diameter. Ten grams of this powder were placed in a muffle furnace under a flow of 1 liter per minute of air and after raising the temperature from 150° C. at a rite of 5° C./minute from 150° C. to 280° C., the furnace was maintained at 280° C. for 10 minutes. The sample was then removed from the furnace. The material thus obtained was treated to give a powder having an average particle diameter of 15 μm. The powder was then calcined for 2 hours at 1200° C. under a slight flow of nitrogen and a pressure of 12 Torr to obtain a carbon material in powdered form. The calcined powdered material was evaluated as an anode material according to the same methods as Example 5. The storage capacity was 658 mAh/g, and the discharge capacity was 600 mAh/g. The capacity loss was 58 mAh/g and the discharge capacity for the potential region of 0 to 0.2 volts versus the lithium metal potential was 429 mh/g.

Comparative Experiment 4

A coal tar pitch having a softening point of 76° C., a ratio of hydrogen atoms to carbon atoms contained in the pitch (H/C) of 0.55, a pyridine insoluble fraction of 0.1% and a ratio of aliphatic carbon to total carbon in the pitch of 3% was placed within a reaction vessel and reacted for 1 hour in a flow of 20 liters of air per minute per kilogram of material to obtain a modified 100% optically isotropic pitch with a softening point of 243° C. The ratio of hydrogen atoms to carbon atoms contained in this modified optically isotropic pitch (H/C) was 0.48. The ratio of the intensity of the aliphatic C—H stretching band as opposed to the aromatic C—H stretching band as measured by FT-1R was 0.0. This modified optically isotropic pitch was ground to a powder having an average particle diameter of 200 μm or less. Ten grams of this powder were placed on a ceramic dish and placed in a muffle furnace where, under a flow of 1 liter of air per minute, it was heated from 150° C. to 320° C. at a rate of 5° C./minute and then maintained at 320° C. for 10 minutes following which it was removed from the furnace. The material thus obtained was melted by raising the temperature and then cooled to a mass. The mass was ground to a powder having a particle size of 15 μm, which was then calcined under a slight flow of nitrogen at 10 Torr and at 1200° C. for 2 hours to obtain a powdered carbon material. The calcined material was evaluated as an anode material according to the methods of Example 5. The storage capacity of the calcined anode material was observed to be 525 mAh/g and the discharge capacity was observed to be 398 mAh/g. The capacity loss was very large at 127 mAh/g and the overall discharge capacity of the battery was reduced. The discharge capacity for the potential region of 0 to 0.2 versus lithium metal was low at 230 mAh/g.

Comparative Experiment 5

Seven moles of naphthalene, 2.45 moles of hydrofluoric acid and 0.77 moles of boron trifluoride were added to a 3 liter acid resistant autoclave and reacted by raising the temperature at self-generated pressure to 100° C. and then maintaining it there for 4 hours. Catalyst was recovered by reducing the pressure after which the material was maintained at a temperature of 200° C. under a flow of 3 L of nitrogen per minute to remove lighter components to obtain a pitch having a softening point of 82° C. The ratio of hydrogen atoms to carbon atoms in this synthetic pitch was 0.76, the pyridine insolube fraction was 0.0% and the ratio of the intensity of the aliphatic C—H stretching bands to total C—H stretching bands when measured by FT-IR was 35%. The synthetic pitch thus obtained was reacted by placing it in another reaction vessel and 20 L of air per kilogram of material were blown through it at 340° C. over 4 hours to obtain an modified 100% optically isotropic pitch having a softening point of 234° C. The ratio of hydrogen atoms to carbon atoms in this modified optically isotropic pitch (H/C) was 0.49, and the ratio of aliphatic C—H stretching band intensity to aromatic C—H stretching band intensity was 0.20. The modified pitch was ground to a powder having a particle diameter of 200 $\mu$m or less. Ten grams of the modified pitch powder were placed on a ceramic dish and then placed in a muffle furnace where a flow of 1 L of air per minute was maintained while the temperature was raised at a rate of 5° C./minute from 150° C. to 320° C. after which it was maintained at 320° C. for 30 minutes. The material obtained was melted into a mass by heating it. This mass was ground to obtain a powder having a particle diameter of 15 $\mu$m. The treated powder was calcined at 1200° C., 10 Torr under a slight flow of nitrogen for 2 hours to obtain a powdered carbon material. The powdered carbon material thus obtained was evaluated as a battery anode material according to the methods of Example 5. The storage capacity was 535 mAh/g and the discharge capacity was 403 mAh/g. The capacity loss was very large at 132 mAh/g and the battery discharge capacity was also low. The discharge corresponding to the potential region of 0 to 0.2 volts versus lithium metal was very low at 240 mAh/g.

What is claimed is:

1. A method for preparing an activated carbon fiber comprising preparing a synthetic pitch having a softening point of 200° C. or less by reacting a member selected from the group consisting of a conjugated polycyclic hydrocarbon containing a low molecular weight alkyl group or a material containing said hydrocarbon in the presence of hydroflouric acid/boron triflouride, treating said synthetic pitch by passing an oxidizing gas through said synthetic pitch at elevated temperatures to form a modified optically isotropic pitch, spinning the modified optically isotropic pitch into fibers, stabilizing said fibers and subjecting the stabilized fibers to activation treatment, said activation treatment comprising passing a gas stream over the fibers, wherein the gas stream comprises at least one of steam, carbon dioxide or oxygen at a temperature of from about 700° C. to about 1000° C.

2. A method for preparing activated carbon fibers according to claim 1, wherein the ratio of hydrogen atoms of said synthetic pitch to carbon atoms is between 0.5 and 1 and the optical characteristics of the synthetic pitch are effectively 100% isotropic.

3. A method for preparing activated carbon fibers according to claim 1, wherein the softening point of the modified optically isotropic pitch is between 180° C. and 350° C., the ratio of hydrogen atoms to carbon atoms in said pitch is 0.5 to 0.8 and the optical characteristics of said pitch are 100% isotropic.

4. A method for preparing carbon materials comprising preparing a synthetic pitch having a softening point of 200° C. or less by reacting a member selected from the group consisting of a conjugated polycyclic hydrocarbon containing a low molecular weight alkyl group or a material containing said hydrocarbon in the presence of hydroflouric acid/boron triflouride, treating said synthetic pitch by passing an oxidizing gas through said synthetic pitch at elevated temperatures to form a modified optically isotropic pitch, stabilizing the modified optically isotropic pitch and calcining the stabilized pitch.

5. A method for preparing carbon materials according to claim 4, wherein the softening point of the modified optically isotropic pitch is from about 180° C. to about 350° C., the ratio of hydrogen atoms to carbon atoms in said pitch is between 0.50 and 0.80, and the ratio of the absorption band corresponding to aliphatic C—H stretching measured by Fourier transform infrared spectroscopy to the corresponding aromatic C—H band is 0.5 or more.

6. A method for preparing carbon materials according to claim 4, wherein stabilizing said modified optically isotropic pitch comprises heating the modified optically isotropic pitch to a temperature of from room temperature up to 400° C. while forcing an oxidizing gas through said modified optically isotropic pitch.

* * * * *